United States Patent [19]

O

[11] Patent Number: 5,284,306
[45] Date of Patent: Feb. 8, 1994

[54] FISH TAPE CONTAINER AND METHOD OF USE

[76] Inventor: Sangkil O, 993 S. Wilton Pl., Los Angeles, Calif. 90019

[21] Appl. No.: 9,987

[22] Filed: Jan. 27, 1993

[51] Int. Cl.⁵ .................. E21C 29/16; B65H 75/36
[52] U.S. Cl. .................... 242/96; 254/134.3 FT; 206/303
[58] Field of Search .............. 206/303, 408; 220/566; 242/96; 254/134.3 FT

[56] References Cited

U.S. PATENT DOCUMENTS

| | | | |
|---|---|---|---|
| 1,501,354 | 7/1924 | Marks | 254/134.3 FT |
| 1,890,945 | 12/1932 | Hormel | 254/134.3 FT |
| 4,413,808 | 11/1983 | Finkle | 254/134.3 FT |
| 5,056,731 | 10/1991 | Koehn | 242/96 |
| 5,201,495 | 4/1993 | Crates et al. | 242/96 |

*Primary Examiner*—William I. Price
*Attorney, Agent, or Firm*—Terry M. Gernstein

[57] ABSTRACT

A special container includes a tubular body that has two spaced apart ends and is in the form of a semicircle having a gap of 60 arc degrees between the two ends. A coil of fish tape having two coils thereof welded together is contained in the tubular body, and is fed out or re-wound by hand by grasping the tape that is exposed in the gap. The body has a plastic outer surface and a steel inner surface.

4 Claims, 4 Drawing Sheets

FISH TAPE CONTAINER AND METHOD OF USE

TECHNICAL FIELD OF THE INVENTION

The present invention relates to the general art of special containers, and to the particular field of special containers for wire, such as fish tape.

BACKGROUND OF THE INVENTION

Many electricians, and others, often must feed a wire through a conduit or through a wall or the like. This is often a difficult and onerous task. Therefore, there have been numerous tools developed to assist such a worker in feeding flexible materials, such as electrical wire, through a long conduit.

One such tool is known as fish tape. Fish tape is an elongated strand of stiff wire, often steel, having a loop on one end thereof and a ball or catch on the other end thereof. Heretofore, fish tape has been stored either unprotected or in cases having a handle thereon. The handle is used to feed the tape into the conduit.

However, the inventor has found that such storage containers may damage the fish tape. For example, the inventor has found that a handle may twist the tape thereby damaging the tape or even breaking it.

Therefore, there is a need for a fish tape container that will store the fish tape in a safe manner, yet will permit that tape to be fed out in a safe and expeditious manner.

OBJECTS OF THE INVENTION

A main object of the present invention is to provide a special container that can safely store fish tape.

Another object of the present invention is to store fish tape in a manner that will not damage that tape, and will permit that tape to be fed out of the container by hand in a safe, yet expeditious, manner.

SUMMARY OF THE INVENTION

These, and other, objects are achieved by a special container for fish tape that includes a semicircular tube. The tube extends over a 300° arc and the ends thereof are spaced apart by the remaining 60° of the arc. This 60° spacing is an optimum balance between the need to provide sufficient room for the fish tape to be manipulated for hand feeding, yet to cover enough of the remaining fish tape to prevent damage to or kinking of that tape. Rims are placed on the tube ends to further protect the tape.

BRIEF DESCRIPTION OF THE DRAWING FIGURES

DETAILED DESCRIPTION OF THE PREFERRED EMBODIMENT OF THE INVENTION

Figure 1:
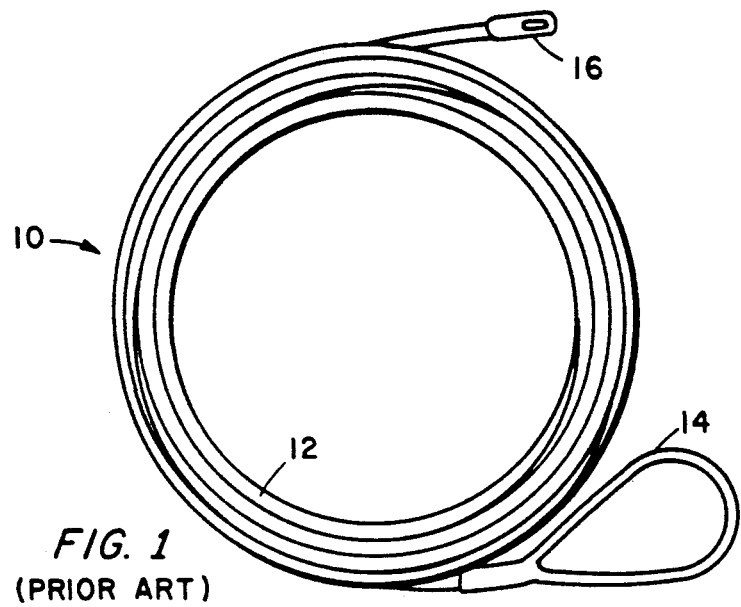
FIG. 1 is a side elevational view of a prior art fish tape.

Shown in FIG. 1 is a prior art fish tape 10 of the type used to pull wires and the like through conduits, walls, or the like. Fish tape 10 includes a body 12 of undefined length having a loop 14 on one end thereof and a clasp 16 on the other end thereof. Tape 10 is used by feeding it into and through a conduit or the like, attaching the clasp to a wire and drawing the fish tape back through the conduit. The movement of the fish tape is generally accomplished by grasping the tape body with a user's hands and moving the tape by hand. As above discussed, such feeding often results in the fish tape kinking, or otherwise being damaged.

Figure 2:
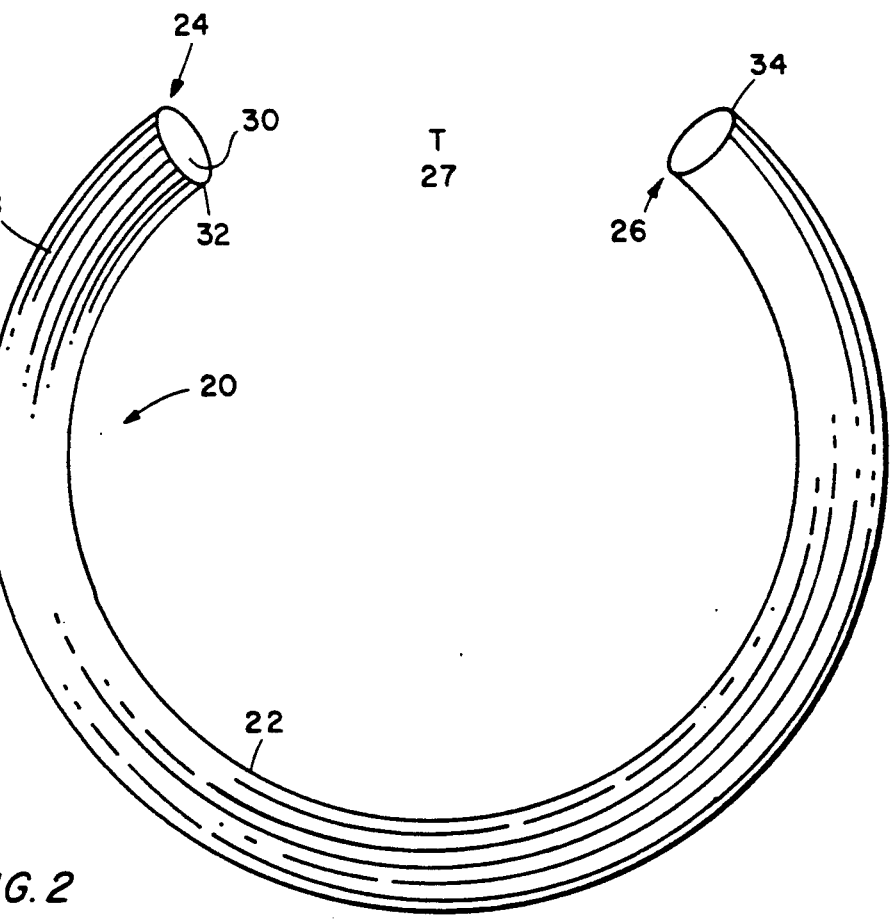
FIG. 2 is a front and top perspective view of the special container for fish tape embodying the present invention.

Therefore, the present invention includes a special container 20, shown in FIG. 2, for containing fish tape 21 and protecting such tape, while permitting that tape to be fed and drawn up by hand in an expeditious and safe manner.

Container 20 includes a tubular body 22 that is in the shape of a semicircle. Body 22 extends for 300° between container ends 24 and 26, which are spaced apart by 60 arc degrees to define a gap 27. As mentioned above, this 60° gap represents an optimum balance between exposing enough of the fish tape contained in the container 20 for efficient hand feeding, while covering enough of the fish tape to adequately protect that tape from damage.

Figure 4:
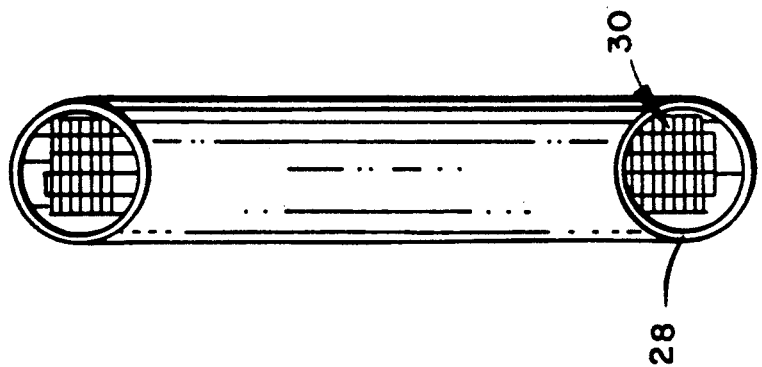
FIG. 4 is an elevational view taken along line 4—4 of FIG. 3.

The container is hollow to have an outer surface 28 and an inner surface 30, and rim elements 32 and 34 cover the ends 24 and 26 respectively. The rim elements further protect the fish tape. The preferred embodiment of the container 20 includes a steel inner surface and a plastic outer surface. The steel inner surface is indicated by the surface shading in FIG. 4.

Figure 3:
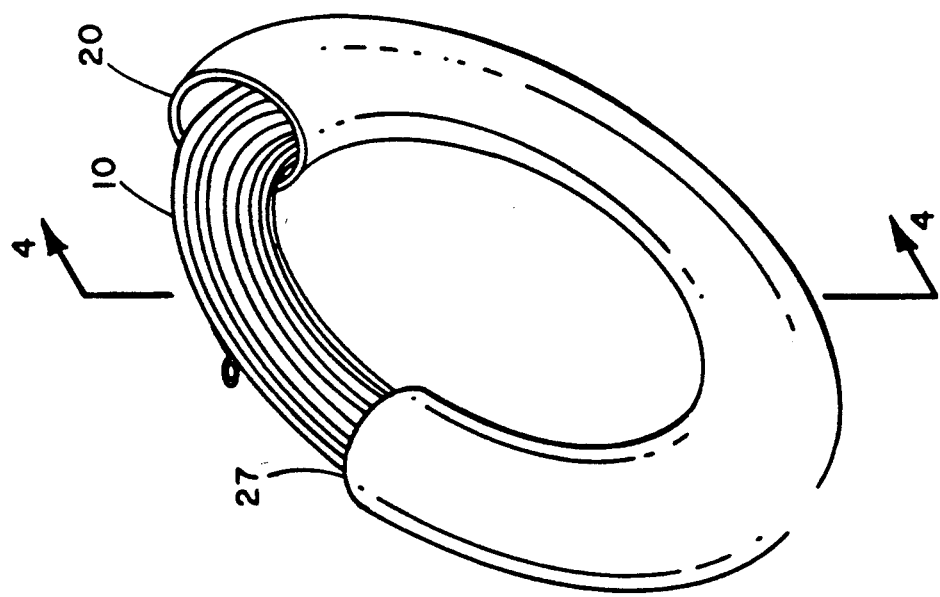
FIG. 3 is a front and top perspective view of the special container for fish tape embodying the present invention with fish tape of the present invention stored therein.
Figure 5:
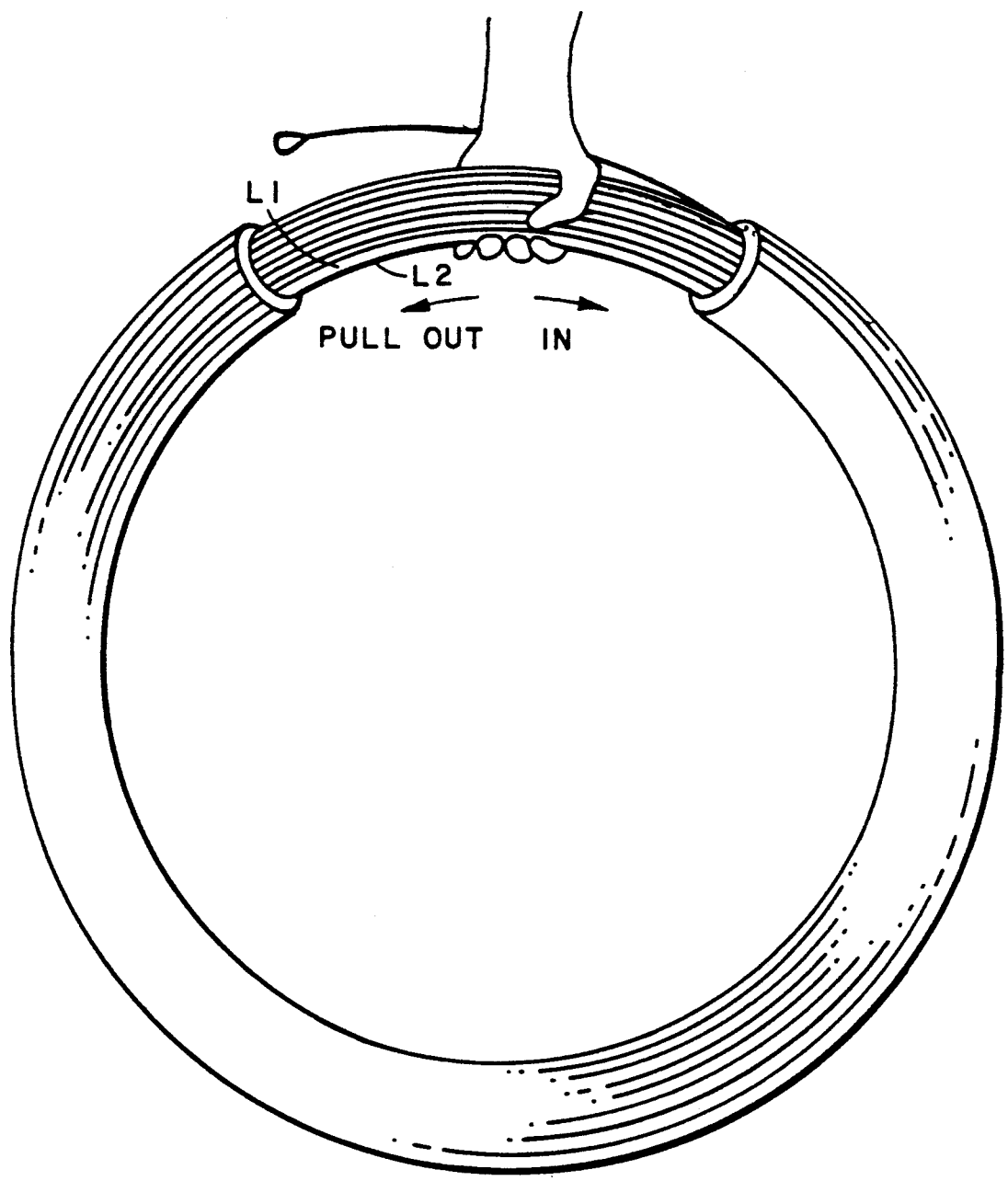
FIG. 5 is a perspective view similar to FIG. 3 illustrating a step in the method of feeding fish tape from the special container of the present invention.

Referring to FIG. 3, it is seen that fish tape 21 is stored in container 20 so that at least one end of the tape is located in the gap 27 to be easily grasped by a user as is illustrated in FIG. 5.

Figure 6A:
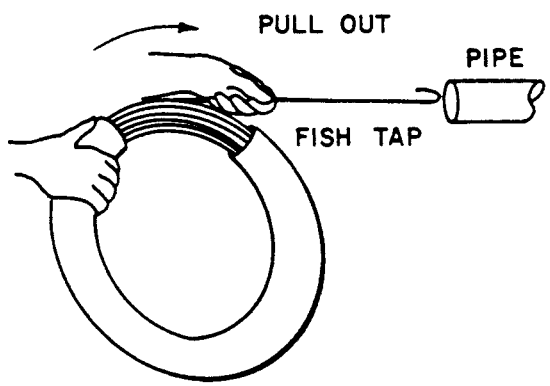
FIGS. 6A–6D are similar to FIG. 5 and illustrate the method of feeding fish tape from the special container of the present invention.
Figure 6B:
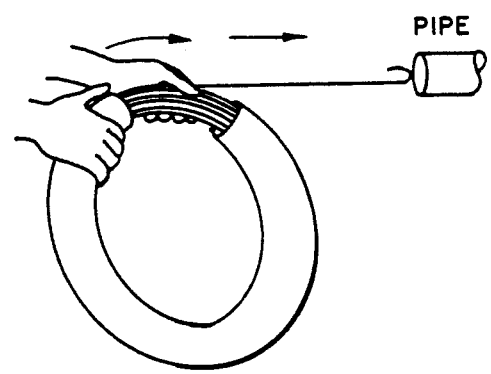
Figure 6C:
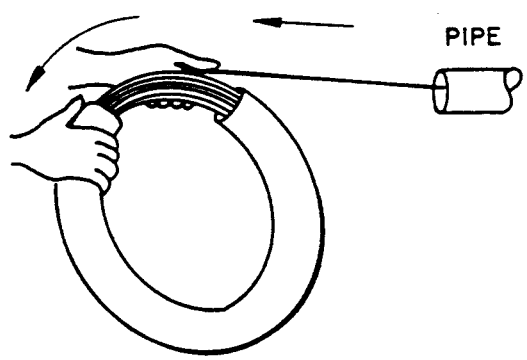
Figure 6D:
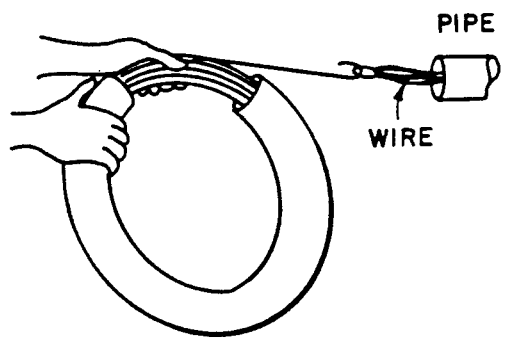

The use of the device is illustrated in FIGS. 6A–6B. As illustrated in FIG. 6A, a user leads one end of the fish tape into a conduit C, and grasps the fish tape exposed in gap 27 with one hand and supports the container with the other hand. As illustrated in FIGS. 6B–6D, the user then feeds the tape into the conduit C by simply grasping the fish tape exposed in gap 27 and forcing the tape into the conduit. The tape is rewound using the same process, but in reverse as indicated in FIG. 5. The tape simply moves about the open-ended tubular case during the feeding or re-winding process.

It is noted that the preferred form of the overall device includes fish tape 21 having the last two loops welded together to prevent the entire tape from being fed out of the container tube. As shown in FIG. 5, loops L1 and L2 are welded together. Fish tape 21 is galvanized or stainless steel fabricated of cold rolled steel and case-hardened for an extremely high tensile strength.

It is understood that while certain forms of the present invention have been illustrated and described herein, it is not to be limited to the specific forms or arrangements of parts described and shown.

I claim:

1. A special container for fish tape comprising: a tubular body, said body having a plastic outer surface and a steel inner surface and having spaced apart ends, said body being in the shape of a semicircle extending for 300 arc degrees between said ends, with said ends being spaced apart by a gap extending 60 arc degrees, and a rim element covering each of said ends.

2. The special container defined in claim 1 further including fish tape contained in said body, said fish tape being fabricated of cold rolled steel and case-hardened.

3. The special container defined in claim 2 wherein said fish tape is coiled and has two coils thereof welded together.

4. A method of feeding fish tape into a conduit comprising:
  A) providing a special container for fish tape that includes a tubular body, the body having a plastic outer surface and a steel inner surface and having spaced apart ends, the body being in the shape of a semicircle extending for 300 arc degrees between the ends, with the ends being spaced apart by a gap extending 60 arc degrees, and a rim element covering each of the ends;
  B) providing a coil of fish tape that is fabricated of cold rolled steel and case-hardened and has two coils thereof welded together in the container;
  C) locating one end of the fish tape in the gap;
  D) feeding the one end into a conduit; and
  E) pushing the fish tape located in the gap and forcing the one end of the fish tape through the conduit with the other end of the fish tape moving through the container body.

* * * * *